(No Model.) 6 Sheets—Sheet 4.

T. McBRIDE & E. FISHER.
DEVICE FOR EXCAVATING COAL, &c.

No. 412,524. Patented Oct. 8, 1889.

WITNESSES:

INVENTORS

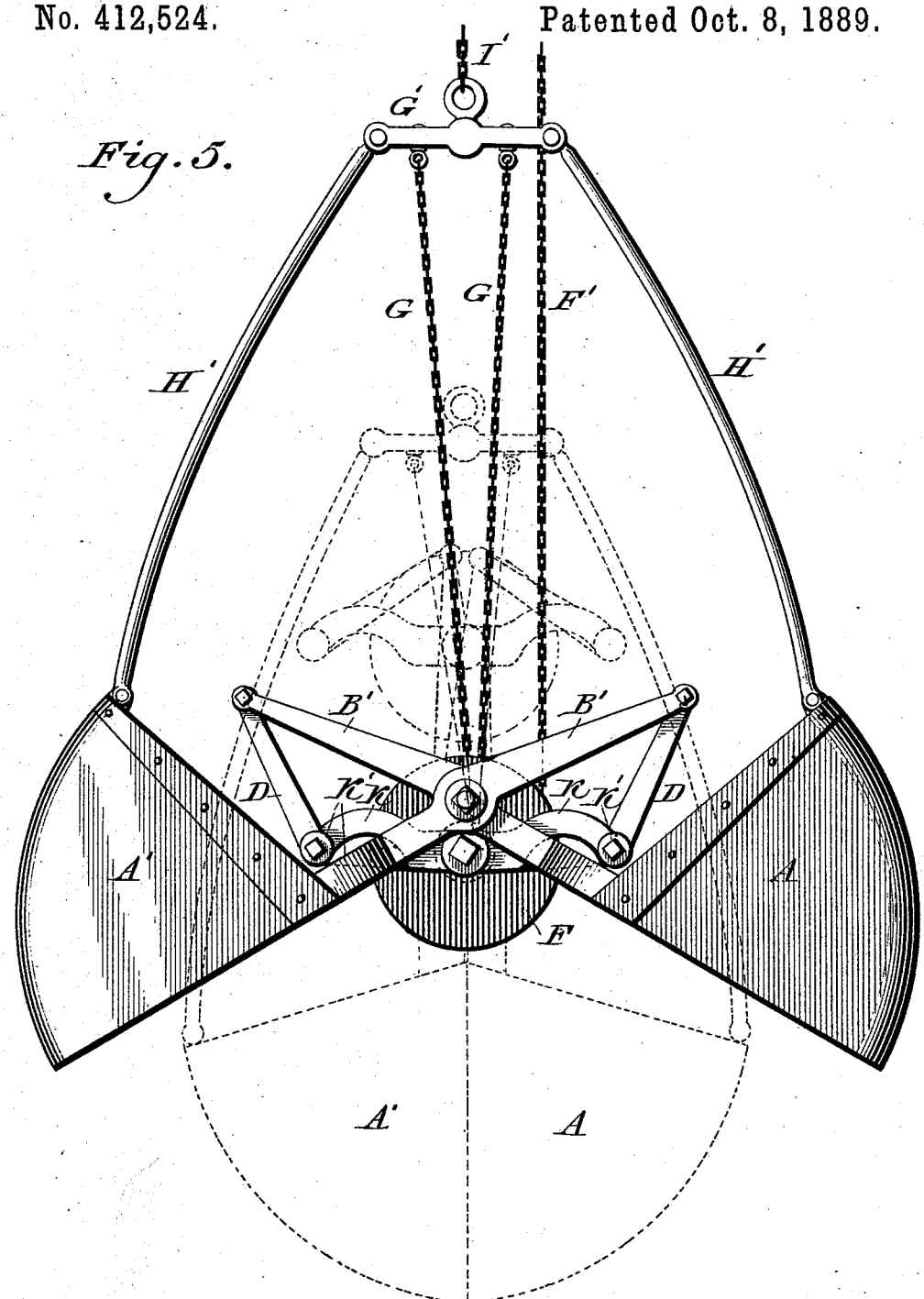

(No Model.) 6 Sheets—Sheet 6.

T. McBRIDE & E. FISHER.
DEVICE FOR EXCAVATING COAL, &c.

No. 412,524. Patented Oct. 8, 1889.

WITNESSES:
P. F. Doyle
H. M. Sterling

INVENTORS
Thos. McBride
E. Fisher
By L. M. Ginsabaugh
Atty.

UNITED STATES PATENT OFFICE.

THOMAS McBRIDE, OF PHILADELPHIA, PENNSYLVANIA, AND EBENEZER FISHER, OF KINCARDINE, ONTARIO, CANADA.

DEVICE FOR EXCAVATING COAL, &c.

SPECIFICATION forming part of Letters Patent No. 412,524, dated October 8, 1889.

Application filed November 22, 1888. Serial No. 291,531. (No model.)

*To all whom it may concern:*

Be it known that we, THOMAS MCBRIDE, a citizen of the United States, residing at Philadelphia, Pennsylvania, and EBENEZER FISHER, a subject of the Queen of Great Britain, residing at Kincardine, in the Province of Ontario and Dominion of Canada, have invented new and useful Improvements in Devices for Excavating Coal, Grain, and other Materials; and we do hereby declare the following to be a full, clear, and exact description of said invention, reference being had to the accompanying drawings, and to the letters or figures of reference marked thereon, which form a part of this specification.

Our invention relates to an improved device for excavating and transferring materials—such as coal, grain, earth, &c.—from one point to another.
The object of our invention is to dispense with the heavy weight of iron or other material now used in this class of devices for forcing the excavating buckets or scoops into the material to be raised, and also to insure a quick and positive closing of the scoops, so as to prevent any of the material from falling out between the scoops; and to this end our invention consists in connecting the arms of the scoops to the winding or operating drum by means of links or bars, whereby the power exerted to close the scoops and hold the same in a closed position is exerted on the outer ends of the arms of the scoops.

Other novel features of our invention will be more fully described in detail hereinafter, and pointed out in the claims.

Figure 1:
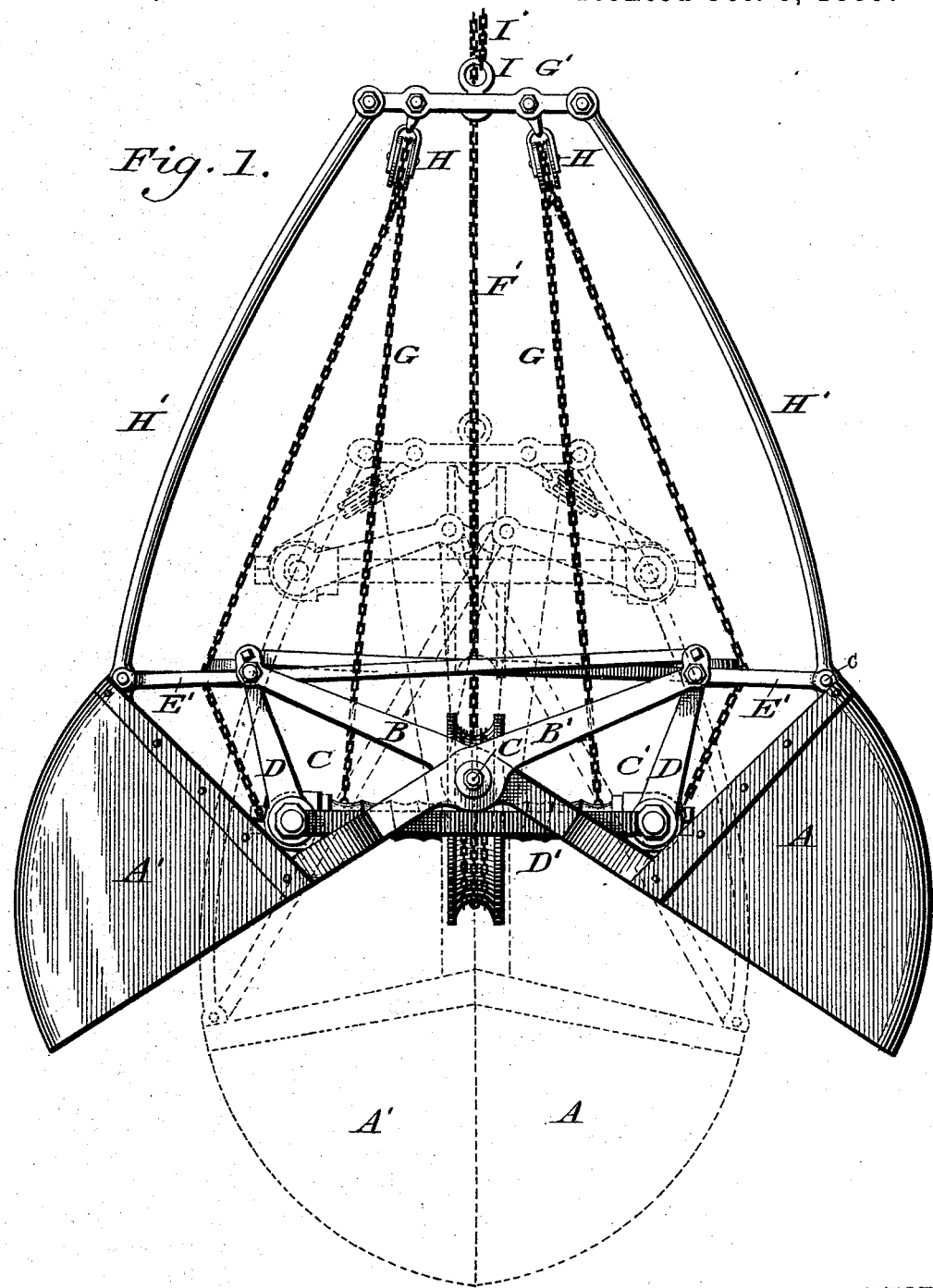
Figure 2:
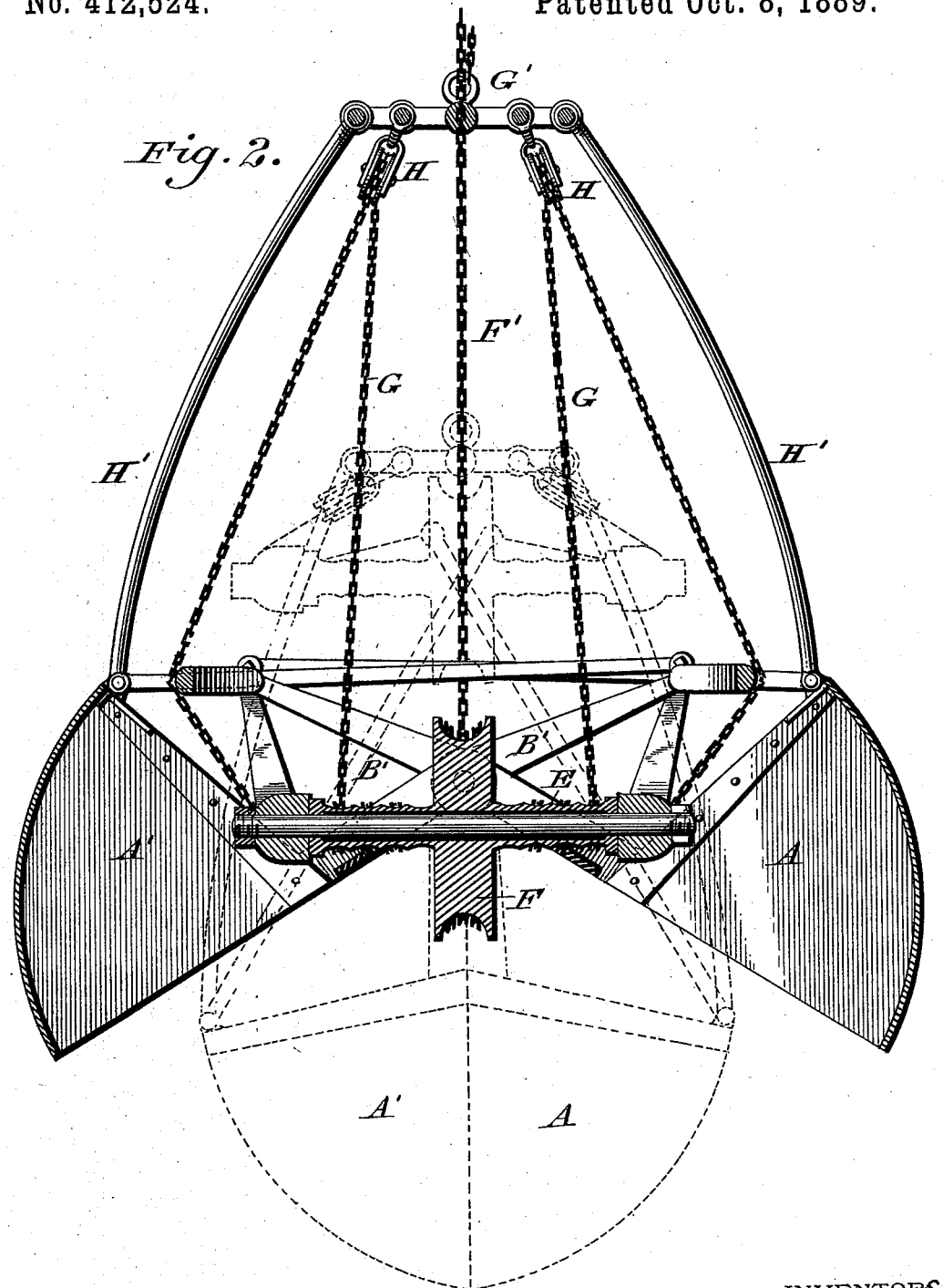
Figure 3:
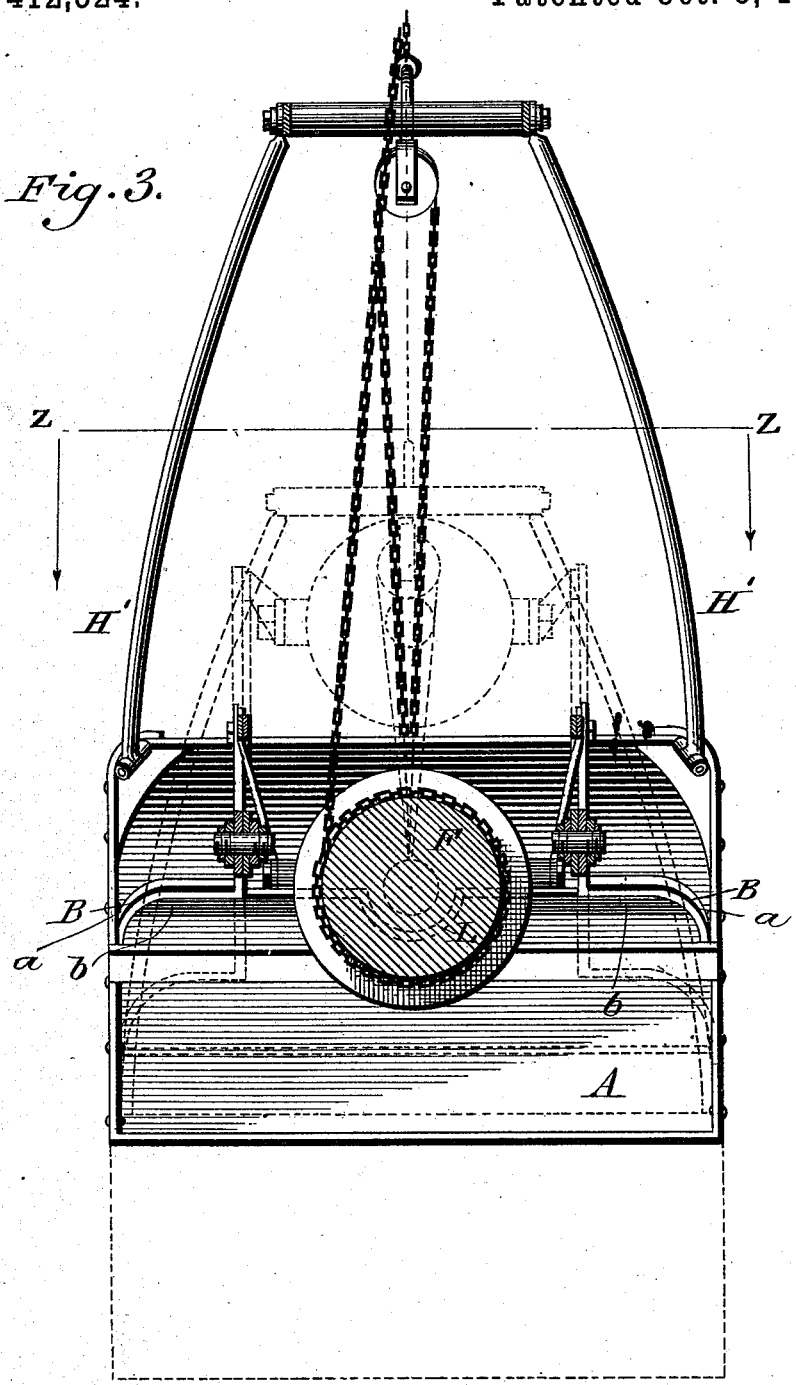
Figure 4:
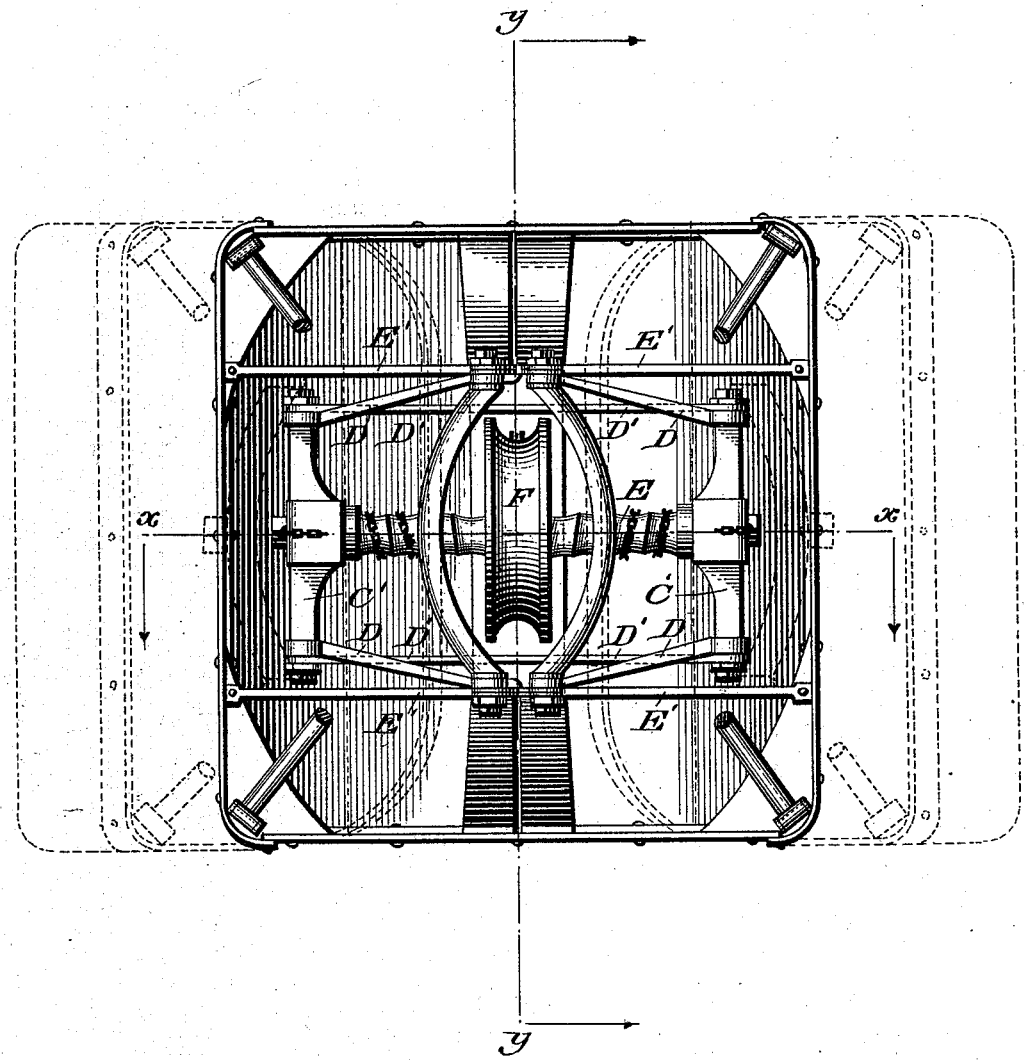
Figure 7:
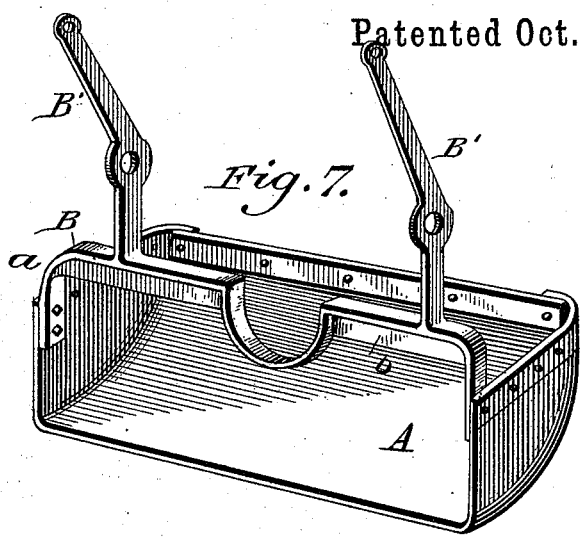
Figure 6:
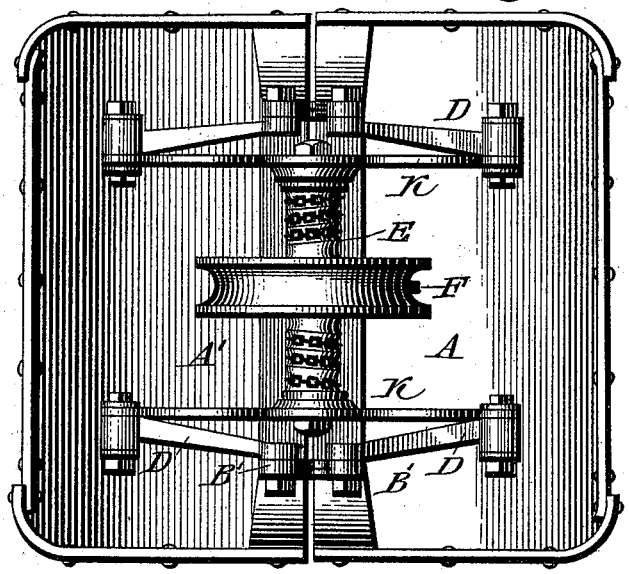

Figure 1 is a side elevation of our improved excavator, showing the same in an open position in full lines and in a closed position in dotted lines. Fig. 2 is a vertical sectional view on the line $x\ x$ of Fig. 4. Fig. 3 is a longitudinal sectional view taken on the line $y\ y$ of Fig. 4. Fig. 4 is a top or plan view taken on the line $z\ z$ of Fig. 3, and with the cross-head which supports the rods removed. Fig. 5 is a side view of a modification, in which the winding and hoisting drum is parallel with the buckets or scoops. Fig. 6 is a top or plan view of the modified form shown in Fig. 5. Fig. 7 is a view in perspective of one of our improved scoops.

A and A' indicate the scoops forming the bucket, said scoops being of the usual clam-shell shape and made of good substantial plate or sheet metal. The upper corners of the scoops are connected by means of the cross-bars B, said bars being bent down at their ends to make an obtuse angle, as shown at $a$, Fig. 7, for a purpose which will more fully hereinafter appear. The cross-bars B have a flange or strengthening-rib $b$ formed on their under side, so as to give rigidity and strength to the structure.

B' are levers or arms, cast or forged with or otherwise secured to the cross-bars, and a short distance from the ends of the same, so that they will set back a short distance from the ends of the scoops. The levers or arms B' of the scoops A and A' are crossed and pivoted together after the fashion of a pair of shears by the bolts C, the outer or free ends of said levers being connected to the bars C' by the toggle-levers D. The bars C' are joined together by suitable stays or brace-rods D', so as to form a frame in which the winding-drum E is mounted.

E' are braces or stay-rods, one end of which is secured to the rear upper edges of the scoops, while the other ends of said rods are secured to the ends of the links or levers B' and toggle-levers D. The office or function of the rods E' is to brace the machine so as to form a rigid structure.

E is a winding-drum, the ends of which are mounted in suitable bearings in the bars C', said drum being provided at its center with a grooved wheel F, around which the hoisting-chain F' is wound. The drum E is provided with spiral grooves on each side of the grooved wheel F to receive the chains G. One end of each of the chains G is secured to the drum E, the other ends being secured to the upper frame G', as shown in Fig. 5; or the chains may be passed through the pulleys H and brought down and secured to the bars C', as shown in Figs. 1, 2, and 4.

As before indicated, G' is an upper frame of rectangular or other form, said frame being connected to the scoops by the rods H'. The rods H' are connected to the outer upper corners of the scoops A and A' with hinge-joints c, so that the scoops can be thrown out at an angle without disturbing the angle of the rods H'. The upper frame G' is provided with an eye I, or other suitable device, to which the chain I' is attached, said chain being connected to a derrick or to a windlass, so that when the loaded scoop has been brought to the dumping-ground the weight of the same may be thrown on the rope I' and the scoops opened to empty the same.

In the construction just described the winding-drum is at right angles to length of the scoops, as shown in Figs. 1, 2, 3, and 4.

In the modification shown in Figs. 5 and 6 the winding-drum is parallel with the length of the scoops A and A'. In this construction the drum is mounted in the bars K, the ends of said bars being connected to the outer ends of the levers B' by links D. The ends of the bars K are adapted to rest on the cross-bars B of the scoops when the same are in an open position, so that the weight of the winding-drum and its chains is utilized to force the scoops down into the material to be raised.

In Fig. 5 the bars K are shown secured at K', so as to allow the drum to settle down well between the scoops, and in Fig. 4 the cross-bar is formed with a bent portion L, as indicated in dotted lines in Fig. 3 and in full lines, Fig. 7, to receive the winding-drum for the same purpose.

It will be noticed that the winding-drum is mounted in a movable frame, and not rigidly attached to the levers of the scoops, as is now practiced, and that after the scoops have been closed onto the material the weight of the load is sustained by the drum.

The operation of our device is as follows: The scoops are open, as indicated in full lines in Figs. 1, 2, and 5, by the weight of the device which is being supported by the rope or chain I', and the winding-drum rests upon the cross-bars of the scoops. In this open position the scoops are let down onto the coal or other material to be excavated. The lowering of the winding-drum causes the chains G to unwind, thus winding the chain F' onto the grooved wheel F. Power is now applied to the chain F', which turns the drum, winding the chains G onto the same, and in this act of winding the power exerted on the frame G' tends to force the scoops down into the material. After the chain F' has been unwound from the wheel F the power is still continued, and the weight of the device comes onto the drum. This causes the drum to rise, and through the links or levers D and levers B' the scoops are closed, and the drums, with the levers, are carried up to the position shown in dotted lines in Figs. 1, 2, and 5. After the scoops are closed the device is carried with its load to the place where it is to be deposited, when the weight of the device, with its load, is transferred to the chain I'. This raises the frame G' and opens the scoops. The descent of the drum unwinds the ropes G and winds the rope or chain F' onto the wheel F.

What we claim, and desire to secure by Letters Patent, is—

1. In an excavating device of the character described, the scoops provided with the lever-arms crossed and pivoted together, as described, the upper ends of said levers being pivoted to one end of toggle-levers, the other end of said toggle-levers being pivoted to the frame which supports the chain-operating drum.

2. In an excavating device of the character described, the chain-operating drum mounted in suitable bearings in end bars, said bars being connected to the arms or levers at the scoops by toggle-levers, whereby the raising and lowering of the drum operates to open and close the scoops, as set forth.

3. In an excavating device of the character described, the combination, with the winding-drum, the winding-wheel located thereon, and the operating-chains, of the scoops, the crossed levers carrying the same, the toggle-levers connecting with the crossed levers and with the edges of the scoops, the curved arms pivotally connected to the said edges of the scoops, and the connecting-bar to which the upper ends of said arms are pivotally connected, whereby the scoops may be lowered or elevated and opened or closed automatically, substantially as specified.

4. In an excavating device of the character described, the combination, with the crossed levers fulcrumed at their intersections and carrying the scoops, of the toggle-levers connecting the said crossed levers with the shaft of the winding-drum, the cross-bars connecting the ends of the scoops being curved to permit the drum to settle well down between the scoops, substantially as specified.

5. In an excavating device of the character described, the combination, with the scoops and the system of operating levers and chains, of the cross-bars having a portion thereof bent, as described, to permit the winding-drum to settle well between the scoops, substantially as specified.

6. In an excavating device of the character described, the combination of a winding-drum having spiral grooves on its periphery near each end, a winding-wheel mounted on said drum, the chains adapted to wind on and unwind from the drums and winding-wheel, respectively, and the scoops, crossed levers, and connecting toggle-levers, whereby the scoops are operated, substantially as specified.

7. In an excavating device, the scoops A and A', provided with the levers B', pivoted together, in combination with the levers D, the connecting-bars E', to which said bars D are hinged, the scoops at the lower ends of the levers B', the rods H' H', connecting the outer ends of the bars E' to the top bar G', the chains G G, connected to the drum E, passed through the suspended pulleys H and secured at their lower ends to the ends of the shaft of the winding-drum, and the chain F', connecting the winding-drum with the top bar G', substantially as specified.

In testimony whereof we affix our signatures in presence of two subscribing witnesses.

THOMAS McBRIDE.
EBENEZER FISHER.

Witnesses:
WM. McBRIDE,
JOHN McBRIDE.